United States Patent [19]
Landeis

[11] Patent Number: 5,904,033
[45] Date of Patent: May 18, 1999

[54] VINE CUTTER

[76] Inventor: Marvin J. Landeis, 2928 Orr Cir., Inkster, N. Dak. 58244

[21] Appl. No.: 08/887,059

[22] Filed: Jul. 2, 1997

[51] Int. Cl.$^6$ .................................................. A01D 33/02
[52] U.S. Cl. ............................. 56/235; 56/256; 56/504; 171/42; 460/904
[58] Field of Search .......................... 56/235, 1, 2, 17.1, 56/504, 256, 255, 295, 327.1, 328.1, 121.4, DIG. 17, DIG. 20; 171/42, 30, DIG. 1; 172/604, 111, 139; 460/904

[56] References Cited

U.S. PATENT DOCUMENTS

| | | | |
|---|---|---|---|
| 2,648,942 | 8/1953 | Grant et al. | 171/42 |
| 3,126,062 | 3/1964 | Schmidt | 171/42 |
| 4,178,747 | 12/1979 | Williams | 56/256 |
| 5,103,623 | 4/1992 | Herrett | 460/904 X |

*Primary Examiner*—Terry Lee Melius
*Attorney, Agent, or Firm*—Michael S. Neustel

[57] ABSTRACT

A vine cutter for cutting entangled vines of potato plants in front of a potato harvester so that the vines do not become entangled and accumulated upon a front portion of the potato harvester. The inventive device includes a frame having a pair of upper members and a pair of opposing lower members, a first disc journaled to the frame, a second disc journaled to the frame below the first disc and having a ground engaging rim attached coaxially, and a motor mechanically connected to the first and second discs. The first disc and the second disc are vertically orientated, and a portion of the discs overlap and are juxtaposed to one another. The pair of discs preferably include a plurality of notches projecting into their respective outer perimeters. The discs rotate at a differential to one another from 1.2 to 2.5 depending upon the type of vines being cut. The ground engaging ring attached to the second disc determines the depth of penetration by the second disc into the ground. The discs preferably rotate opposite of one another with a lower portion of the second disc rotating with the movement of the frame with respect to the ground surface.

16 Claims, 2 Drawing Sheets

VINE CUTTER

BACKGROUND OF THE INVENTION

1. Field of the Invention

The present invention relates generally to potato harvesting devices and more specifically it relates to a vine cutter for cutting entangled vines of potato plants in front of a potato harvester so that the vines do not become entangled and accumulated upon a front portion of the potato harvester.

A potato harvester typically harvests two rows of potatoes at a time. However, the vines from neighboring rows typically grow across the pair of rows being harvested causing them to become entangled about the side portions of the potato harvester. The entangled vines then uproot the attached tubers where after the tubers are damaged by sunlight. Further, the entangled vines accumulate on the side portions of the potato harvester requiring the operator to stop the potato harvester for cleaning the accumulated vines away. The sun damaged tubers have to be separated from the undamaged tubers and are unrecoverable into a viable product. It is therefore necessary that the vines surrounding the harvested pair of rows be cut from the vines of adjacent rows before the tubers can be properly dug by the potato harvester.

Conventional vine cutters comprise a single disc attached to the potato harvester which rotates with the movement of the potato harvester. The ground penetration of the disc in combination with the rotating cuts the vines. However, when the vines are wet or green, the vines are simply pressed deep into the ground and not cut. The vines then become entangled within the potato harvester. Also, the conventional vine cutters used today create a narrow channel in front of the potato harvester defining a side wall of dirt. When the digger portion of the potato harvester penetrates the ground to remove the potatoes, the side wall of dirt allows chunks of dirt to remain instead of being broken up. These chunks of dirt engage the tubers thereby causing damage to them. Also the chunks of dirt with the harvested tubers store moisture which causes rotting of the tubers during storage.

2. Description of the Prior Art

There are numerous potato harvesting devices. For example, U.S. Pat. No. 2,562,387 to Perry; U.S. Pat. No. 3,126,062 to Schmidt; U.S. Pat. No. 2,537,198 to Wetzel et al.; U.S. Pat. No. 4,026,092 to Wehde; U.S. Pat. No. 3,756,322 to Kopasz; U.S. Pat. No. 2,608,815 to Graaff, U.S. Pat. No. 1,321,782 to Barrett; U.S. Pat. No. 1,576,364 to Russell et al.; U.S. Pat. No. 1,848,265 to Moreau; U.S. Pat. No. 1,872,639 to Licht; U.S. Pat. No. 2,141,806 to Zielesch; U.S. Pat. No. 2,539,881 to Wilkins; U.S. Pat. No. 3,589,117 to Wadsworth; U.S. Pat. No. 3,194,317 to Vautinall are illustrative of such prior art.

Perry (U.S. Pat. No. 2,562,387) discloses a power driven vine cutter having a pair of rotary vine cutters distally spaced so as to be positioned between the rows, a corresponding pair of rods to assure against entanglement of heavy vines in the rotary parts, and an engine 19.

Schmidt (U.S. Pat. No. 3,126,062) discloses a foliage deflecting unit utilized in combination with a pair of coulters for severing the foliage which upstands between the paths of the coulters impairing the effectiveness of the harvesting mechanism.

While these devices may be suitable for the particular purpose to which they address, they are not as suitable for cutting entangled vines of potato plants in front of a potato harvester so that the vines do not become entangled and accumulated upon a front portion of the potato harvester. None of the prior art discloses an invention which adequately severs the entanglement of the vines of adjacent rows of a crop. The invention disclosed by Perry does not penetrate the ground to sever vines entangled within the ground. Further, the structure of Perry is prone to becoming entangled within the vines because of the nonmoving parts in the frontal portion. The present invention penetrates the ground to sever vines within the ground. Further, the present invention is not prone to clogging or entanglement with the vines because of its dual cutting discs.

In these respects, the vine cutter according to the present invention substantially departs from the conventional concepts and designs of the prior art, and in so doing provides an apparatus primarily developed for the purpose of cutting entangled vines of potato plants in front of a potato harvester so that the vines do not become entangled and accumulated upon a front portion of the potato harvester.

SUMMARY OF THE INVENTION

A primary object of the present invention is to provide a vine cutter that will overcome the shortcomings of the prior art devices.

Another object is to provide a vine cutter that quickly and efficiently severs entangled vines surrounding a pair of rows to be harvested.

An additional object is to provide a vine cutter that reduces the amount of sun damaged tubers.

A further object is to provide a vine cutter that severs entangled vines positioned within the ground.

Another object is to provide a vine cutter that is not prone to clogging from entangled vines.

Another object is to provide a vine cutter that maintains its own depth of penetration into the ground surface for severing entangled vines within the ground.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
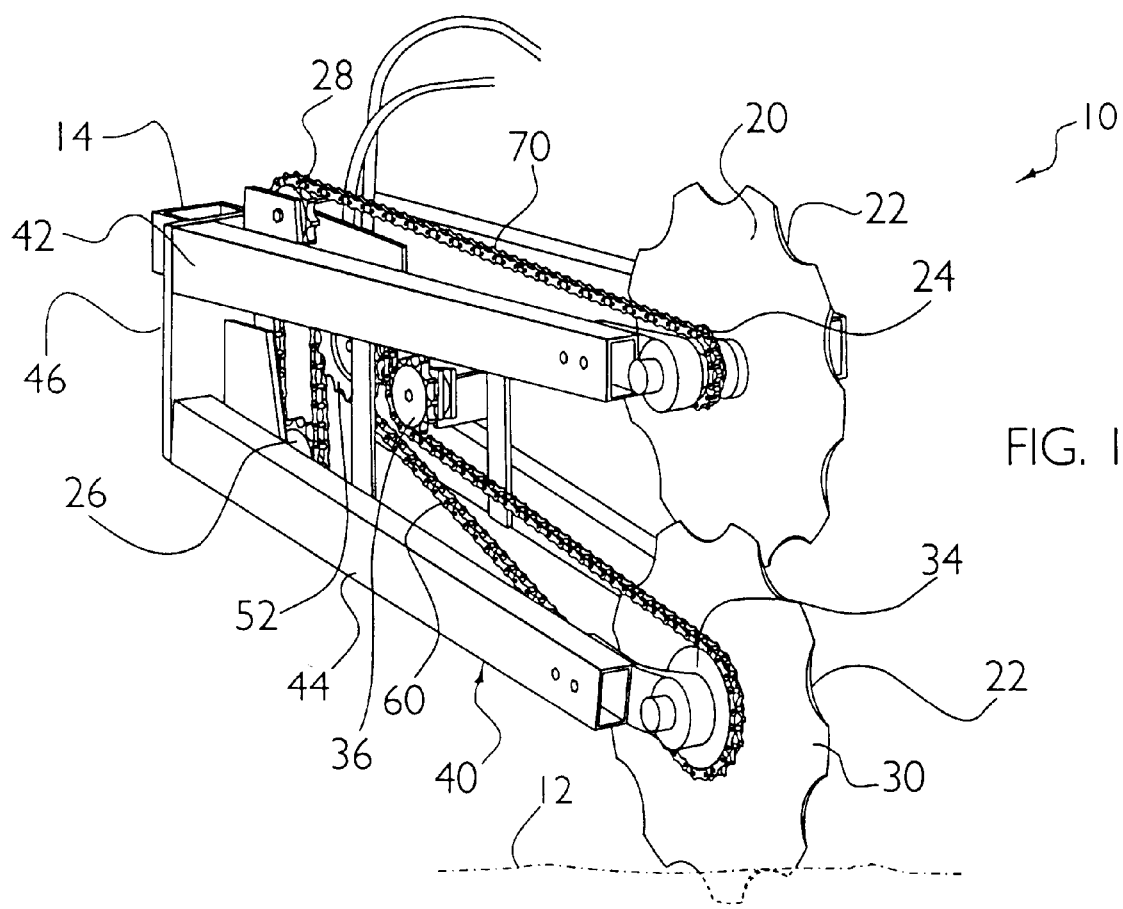
FIG. 1 is an upper perspective view of the present invention.

Turning now descriptively to the drawings, in which similar reference characters denote similar elements throughout the several view, FIGS. 1 through 5 illustrate a vine cutter 10, which comprises a frame 40 having a pair of upper members 42 and a pair of opposing lower members 44, a first disc 20 journaled to the frame 40, a second disc 30 journaled to the frame 40 below the first disc 20 and having a rigid rim attached coaxially, and a motor 50 mechanically connected to the pair of discs. The first disc 20 and the second disc 30 are vertically orientated, and a portion of the discs overlap and are juxtaposed to one another. The pair of discs preferably include a plurality of notches 22 projecting into their respective outer perimeters. The discs rotate at a differential to one another from 1.2 to 2.5 depending upon the type of vines being cut. The rigid ring 32 attached to the second disc 30 determines the depth of penetration by the second disc 30 into the ground. The pair of discs are preferably rotated opposite of one another.

Figure 2:
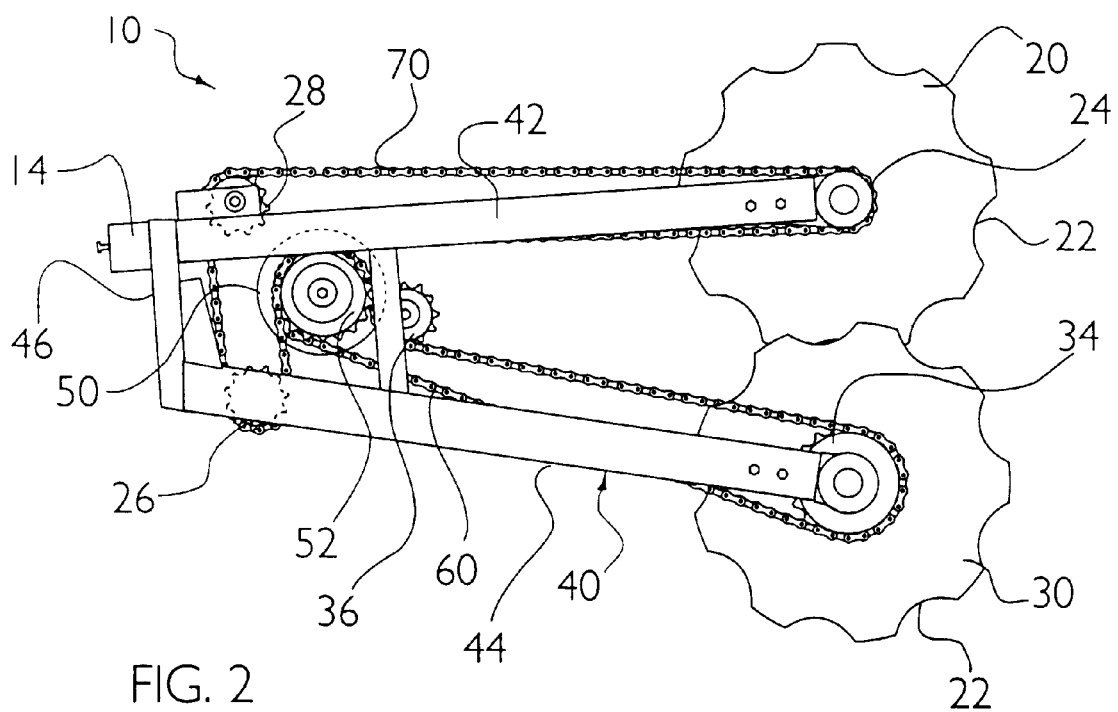
FIG. 2 is a side view of the present invention in operation.

As best shown in FIG. 1 of the drawings, the frame 40 includes a pair of upper members 42 distally spaced parallel to each other. A corresponding pair of lower members 44 are positioned below the pair of upper members 42 forming a rectangular box shape having a front end and a rear end. A rear member 46 is attached to the rear end portion of the pair of upper members 42 and lower members 44. As best illustrated in FIG. 2 of the drawings, the pair of upper members 42 and the pair of lower members 44 project a slight angle away from one another. An attaching means 14 is secured to the rear member 46 for securing the present invention to a frontal side of a potato harvester.

Figure 5:
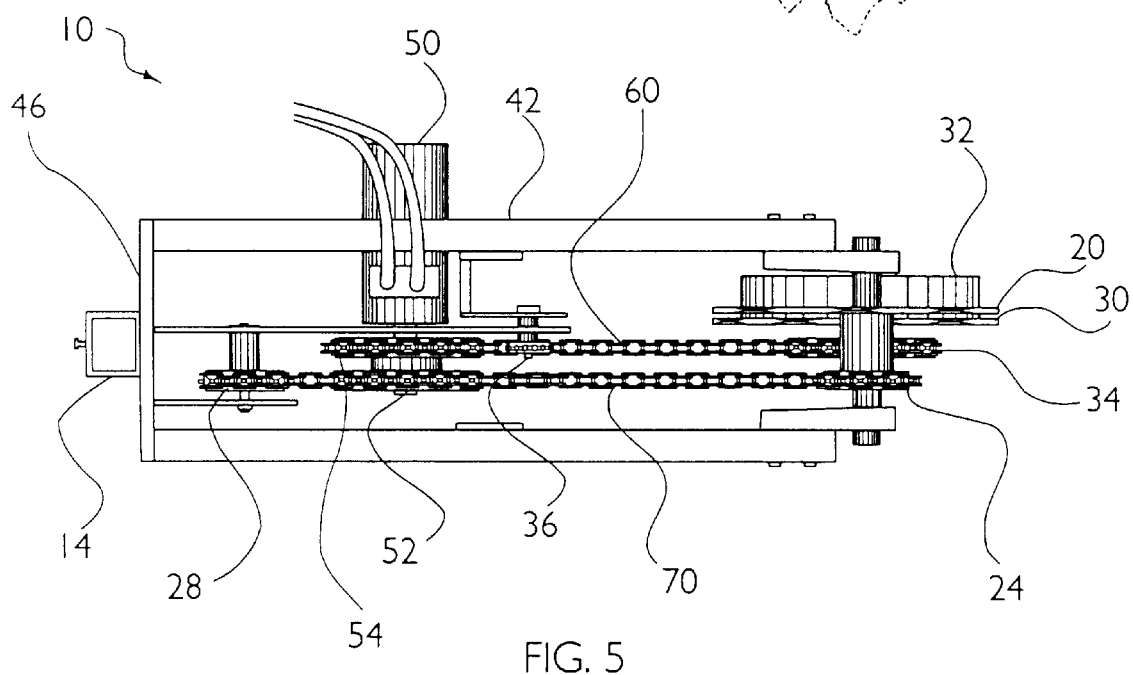
FIG. 5 is a top view of the present invention.

The first disc 20 is journaled between the pair of upper members 42 and is vertically orientated parallel to the second disc 30 as best illustrated in FIG. 5 of the drawings. The first disc 20 includes a plurality of notches 22 projecting into an outer perimeter of the first disc 20 for capturing the vines to be cut.

Figure 3:
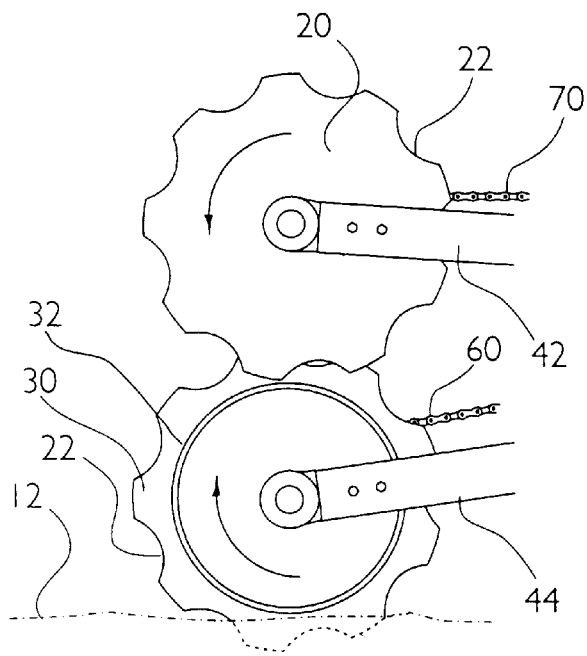
FIG. 3 is a magnified side view of the cutting discs.
Figure 4:
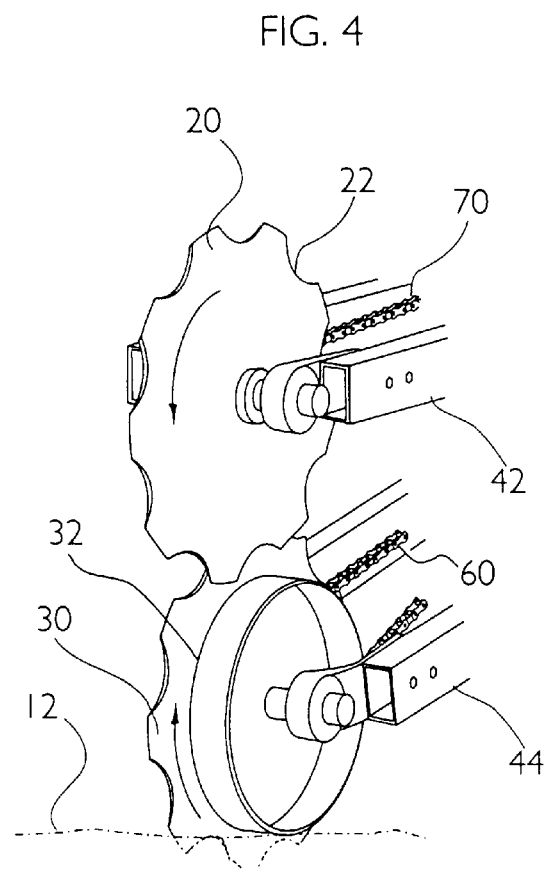
FIG. 4 is a magnified perspective view of the cutting discs.

The second disc 30 is journaled between the pair of lower members 44 and is vertically orientated as best shown in FIG. 1 of the drawings. The second disc 30 includes a rigid ring 32 coaxially attached. The second disc 30 penetrates the ground a predetermined depth as shown in FIGS. 3 and 4 of the drawings. The second disc 30 has an under rotation with the movement of the frame 40. In other words, the second disc 30 rotates so that a lower portion of the second disc 30 rotates with the movement of the frame 40. The ring 32 attached to the second disc 30 determines the depth that the second disc 30 penetrates the ground surface 12. The second disc 30 includes a plurality of notches 22 projecting into an outer perimeter of the second disc 30 for capturing the vines to be cut. A portion of the second disc 30 overlaps with the first disc 20 for providing a cutting portion where the vines are severed as shown in FIG. 4 of the drawings. The first disc 20 and the second disc 30 are self sharpening from rotating juxtaposed to one another.

As shown in FIGS. 1, 2 and 5 of the drawings, a motor 50 is mechanically connected to the first disc 20 and the second disc 30 by a first chain 60 and a second chain 70 respectively. The motor 50 may either be hydraulic, electric, gas or mechanically powered. The motor 50 has a first drive sprocket 52 and a second drive sprocket 54 coaxially secured to a shaft of the motor 50 as best shown in FIG. 3 of the drawings.

As shown in FIG. 5 of the drawings, the first chain 60 is connected to an upper portion of the first drive sprocket 52. The first chain 60 thereafter engages a lower sprocket 28 and then engages an upper sprocket 26. The first chain 60 then engages the first gear 24 secured coaxially to the first disc 20. The upper sprocket 26 is preferably adjustable to allow the user to adjust the tension in the first chain 60.

As shown in FIG. 5 of the drawings, the second chain 70 is connected to the second drive sprocket 54. The second chain 70 directly engages the second gear 34 attached to the second disc 30 coaxially and opposite of the ring 32 for rotating a lower portion of the second disc 30 in a direction opposite of the movement of the frame 40. A tightening sprocket 36 engages the second chain 70 at its lower perimeter. The tightening sprocket 36 is adjustable for allowing the user to adjust the tension of the second chain 70.

The rotational speed ratio between the first disc 20 and the second disc 30 preferably ranges between 1.2 to 2.5. This is adjusted by selecting the appropriate size of first gear 24 and/or second gear 34. The first disc 20 and the second disc 30 rotate opposite of one another so as to feed the vines into the overlapping area between the pair of discs 20, 30.

In use, the attaching means 14 is fastened to the front side portion of the potato harvester. The motor 50 rotates the first disc 20 and the second disc 30 simultaneously and opposite of one another. An outer portion of the second disc 30 penetrates the ground surface 12 as limited by the support of the rigid ring 32. The second disc 30 engages vines which have become entangled within and above the ground a finite distance. This is an important feature of the present invention in that often the vines of the potato plant will grow not only on top of the ground surface 12, but will grow below the ground surface 12 where conventional vine cutters are unable to reach. The second disc 30 thereafter guides the entangled vines upwardly toward a portion between the second disc 30 and the first disc 20 where the pair of discs 20, 30 are juxtaposed to one another. The guided vines are thereafter severed within the notches 22 of the pair of discs 20, 30. The digger portion of the potato harvester then may dig the tubers without becoming entangled within the vines of the crop. When the potato harvester is at the end of a row and elevated, the present invention is elevated simultaneously thereby preventing accidental damage to the present invention from leaving the second disc 30 within the ground.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vine cutter, comprising:
   a frame having a first end and a second end, said first end attachable to a front side portion of a potato harvester;
   a cutting means attached to said second end of said frame for cutting vines of a crop;
   wherein said cutting means penetrates a ground surface at a predetermined depth for cutting vines located in said ground; and wherein said cutting means comprises:
- a first disc journaled to said frame and vertically oriented, wherein a plane of said first disc is parallel to a longitudinal axis of said frame; and
- a second disc journaled to said frame and vertically oriented, wherein a plane of said second disc is parallel to said longitudinal axis of said frame;
- a motor means mechanically connected to said first disc and said second disc for rotating said discs opposite of one another, wherein said second disc has an under rotation with a movement of said frame;
- wherein said second disc is positioned below said first disc and engageable to said ground; and
- wherein said first disc and said second disc have juxtaposed outer portions for cutting said vines.

2. The vine cutter of claim 1, wherein a ground engaging ring is secured coaxially to said second disc, wherein a radius of said ground engaging ring is shorter than a radius of said second disc for determining said predetermined depth at which said second disc penetrates said ground.

3. The vine cutter of claim 2, wherein said first disc and said second disc include a plurality of notches projecting into an outer perimeter thereof.

4. The vine cutter of claim 3, wherein a rotational ratio between said first disc and said second disc is between 1.2 and 2.5.

5. The vine cutter of claim 4, wherein said motor means comprises a hydraulic motor.

6. A vine cutter, comprising:
- a frame having a first end and a second end;
- an attaching means secured to said first end for removably attaching said frame to a front side portion of a potato harvester;
- a cutting means attached to said second end of said frame for cutting vines of a crop;
- wherein said cutting means penetrates a ground surface at a predetermined depth for cutting vines located in said ground; and
- wherein said cutting means comprises:
  - a first disc journaled to said frame and vertically oriented, wherein a plane of said first disc is parallel to a longitudinal axis of said frame; and
  - a second disc journaled to said frame and vertically oriented, wherein a plane of said second disc is parallel to said longitudinal axis of said frame;
  - a motor means mechanically connected to said first disc and said second disc for rotating said discs opposite of one another, wherein said second disc has an under rotation with a movement of said frame;
  - wherein said second disc is positioned below said first disc and engageable to said ground; and
  - wherein said first disc and said second disc have juxtaposed outer portions for cutting said vines.

7. The vine cutter of claim 6, wherein a ground engaging ring is secured coaxially to said second disc, wherein a radius of said ground engaging ring is shorter than a radius of said second disc for determining said predetermined depth at which said second disc penetrates said ground.

8. The vine cutter of claim 6, wherein said first disc and said second disc include a plurality of notches projecting into an outer perimeter thereof.

9. The vine cutter of claim 8, wherein a rotational ratio between said first disc and said second disc is between 1.2 and 2.5.

10. The vine cutter of claim 9, wherein said motor means comprises a hydraulic motor.

11. A vine cutter for cutting potato vines, comprising:
- a frame having a first end and a second end, wherein said first end is attachable to a front side portion of a potato harvester; and
- a cutting means attached to said second end of said frame for cutting said vines;
- wherein said cutting means comprises:
  - a first disc journaled to said frame and vertically oriented;
  - a second disc journaled to said frame and vertically oriented, wherein said second disc is positioned below said first disc;
  - a motor means mechanically connected to said first disc and said second disc for rotating said discs opposite of one another, wherein said second disc has an under rotation with a movement of said frame; and
  - wherein said first disc and said second disc have juxtaposed portions for cutting said vines.

12. The vine cutter of claim 11, wherein said second disc penetrates a ground surface at a predetermined depth for cutting vines located in said ground.

13. The vine cutter of claim 12, wherein a ground engaging ring is secured coaxially to said second disc, wherein a radius of said ground engaging ring is shorter than a radius of said second disc for determining said predetermined depth at which said second disc penetrates said ground.

14. The vine cutter of claim 11, wherein at least one of said first disc and said second disc include a plurality of notches projecting into an outer perimeter thereof.

15. The vine cutter of claim 11, wherein a rotational ratio between said first disc and said second disc is between 1.2 and 2.5.

16. The vine cutter of claim 11, wherein said motor means comprises a hydraulic motor.

* * * * *